United States Patent [19]

Slater

[11] Patent Number: 6,123,049

[45] Date of Patent: Sep. 26, 2000

[54] BULLET PROOF CANINE VEST

[76] Inventor: James Slater, 820 Kildonan Dr., Winnipeg, Manitoba, Canada, R2K 2E9

[21] Appl. No.: 09/248,896

[22] Filed: Feb. 12, 1999

[30] Foreign Application Priority Data

Oct. 5, 1998 [CA] Canada .................................. 2249186

[51] Int. Cl.[7] .............................. A01K 13/00; B68G 5/00
[52] U.S. Cl. ........................................... 119/850; 54/79.2
[58] Field of Search ..................................... 119/850, 792, 119/856, 858, 863, 864; D30/144, 145; 54/79.1, 79.2, 79.4

[56] References Cited

U.S. PATENT DOCUMENTS

| | | | |
|---|---|---|---|
| D. 363,572 | 10/1995 | Obenchain | D30/145 |
| 3,742,679 | 7/1973 | Jordan . | |
| 4,355,600 | 10/1982 | Zielinski | 119/850 |
| 4,385,592 | 5/1983 | Goldstein | 602/18 |
| 4,507,802 | 4/1985 | Small | 2/2.5 |
| 4,601,067 | 7/1986 | Buonassissi | 2/102 |
| 5,068,921 | 12/1991 | Jones | 2/2.5 |
| 5,544,363 | 8/1996 | McCue et al. | 2/102 |
| 5,996,537 | 12/1999 | Caditz | 119/850 |

Primary Examiner—Peter M. Poon
Assistant Examiner—Yvonne R. Abbott
Attorney, Agent, or Firm—Robert G. Hendry

[57] ABSTRACT

A canine vest having ballistic panels has an outer covering including a longitudinally extending elastic panel. Apertures are provided for a dog's front legs and front and rear ballistic panels are removably secured to an inner face of the cover in addition opposed side panels of ballistic material secured the inner face of the cover. A top closure is provided preferably a zipper type fastener and additionally a rappelling ring may be provided adjacent the top closure.

2 Claims, 4 Drawing Sheets

BULLET PROOF CANINE VEST

This invention relates to soft body armour and more particularly to a canine vest having ballistic panels.

BACKGROUND OF THE INVENTION

The work of a Police Service Dog (PSD) is extremely dangerous and very unpredictable. Statistics indicate that one in four dog handlers will be involved in an armed encounter while working. The reality of this type of work is that virtually every call a canine team attends is in progress. The most common types of all calls attended to on a regular basis would include Armed Robberies in progress. Break and Enters in progress, Thefts in progress, Assaults in progress, calls involving people who have armed themselves with some form of weapon, and Traffic Pursuits. On top of these types of "regular calls" there are a growing number of dog handlers who have trained their Police Service Dogs to work in conjunction with "Special Weapons and Tactics Teams", commonly referred to as SWAT, or "Emergency Response Teams", commonly referred to as ERT.

If an ERT Team is involved, then the situation very likely involves guns and other dangerous weapons, barricaded persons, and or hostages. The role of the Police Service Dog in a SWAT or ERT scenario is multi-dimensional and highly specialized. The police dog is generally used for his scenting abilities to locate hidden persons and on occasion, for an apprehension, or extraction without lethal force.

Tactical deployment scenarios in conjunction with an entire SWAT/ERT team include:

Stealth on line room clearing searches;

Dynamic entries; and

High risk bush tracking for serious criminal offenses (daylight/night with Night Vision Equipment and Infra Red).

The primary purpose of the vest is to provide the police dog with soft body armour similar to that worn by Police Officers all over the world. The vest not only builds in ballistic protection covering the dog's vital organs but it does so without restricting the dog's ability to move. Agility cannot be sacrificed for ballistic protection. Doing so would disable the dog, making him a slow-moving, easy target.

The invention seeks to provide a vest which covers a dog's vital organs, chest, back and stomach. The carrier is made of a flat back, non reflective cordura which it is lightweight and rugged. The vest ends forward of the dog's rear legs and hips, so as not to restrict speed and movement. This design also allows canine to relieve himself as required without soiling the vest or removal of same.

Furthermore, the vest includes a rappelling harness designed to allow the dog to accompany the handler in rappelling situations such as off buildings and helicopters. When the rappel is completed the carabineer is quickly removed allowing the dog to be immediately available for tactical deployment.

DISCUSSION OF THE PRIOR ART

Prior attempts to provide a canine bullet-proof vest include U.S. Pat. No. 5,068,921 disclosing a vest which, covers the dog's vital organs, chest, back and stomach but continues on past the rear legs, covering the hips and rear quarters. This design will severely affect the dog's ability to run, jump, sit and lie down. As well, partial or full removal of the vest would be required in order for the dog to relieve himself.

In the aforementioned U.S. Patent the front leg apertures are too small and once again restrict the dog's movement and ability to jump. This design has the front apertures fitted above the dog's shoulder joints allowing for full range of motion. Since the vest ends forward on the dog's hind legs and hips there is no restriction of movement in the back legs.

Unlike the U.S. Patent where the carrier is a two piece design which is held together via Velcro on the underside of the dog, this design is a one-piece carrier which fastens on top of the dog. This is also desirable because in low light situations it is much easier to secure the vest on top of the dog than underneath. Also since it is one piece and zips up quickly along the dog's spine it is very quickly and easily put on the dog in stress or low light situations.

The carrier is also fitted with an elastic panel built-in its entire length. This allows the vest to be flexible and not restrict the dog's breathing movement while at the same time keeping the vest fitted snug and not loose or sloppy. The U.S. Patent has no such provision resulting in the serious compromising of the dog's ability to bend and curl.

The four panels in this design allow for overlapping giving great protection to the dog's vital organs but at the same time the panels are secured in place by Velcro strips once again not compromising the dogs ability to freely move. The U.S. Patent has only two panels and while protecting the vital organs seriously impedes the dog's ability to move.

This design is custom fit to each type of dog based on a series of individual measurements. There are no hanging buckles and the vest is very fitted not allowing for bulging. The U.S. Patent also is based on individual measurements but seems to be more of a universal fit. Consequently at times the garment hangs in the belly and bulges on the back neat the hind quarters. There are a total of nine straps securing the vest to the dog which can get caught in various situations seriously endangering the dog and the handler.

This design incorporates a tracking harness constructed of nylon webbing sewn directly into the carrier, along with a welded 'D' ring located in the reinforced spine of the carrier. The U.S. Patent has no such provisions.

Furthermore, this design is equipped with a rappelling harness, constructed of rugged nylon webbing and sewn directly into the carrier. It is sewn extra wide on the underside and distributes the weight of the dog evenly through the chest and rear legs. The rear leg straps when not in use are secured into the carrier and are not visible. When in use the straps loop under the dogs legs and are secured to the buckles found on the side of the vest. The dog sits comfortably of a 45 degree angle and with the use of the 'D' ring, free (off a helicopter) and wall rappelling is easily accomplished. When the rappel is complete the carabineer is removed easily from the 'D' ring and the dog is ready for deployment. The U.S. Patent has no such provision.

Also the U.S. Patent mentions no provision of a removable, reflective 'POLICE' sign on either side of the vest, for which this design allows.

STATEMENT OF THE INVENTION

Accordingly the present invention provides:

canine ballistic vest and harness comprising (a) a carrier of synthetic textile material adapted to cover the underside of a dog, fastening means on side edges of the carrier to fasten the carrier along the back portion of the dog;

(b) a plurality of panels of ballistic material held in place by the carrier to protect at least a chest portion and vital portions of sides of the dog.

DETAILED DESCRIPTION OF THE DRAWINGS

Figure 1:
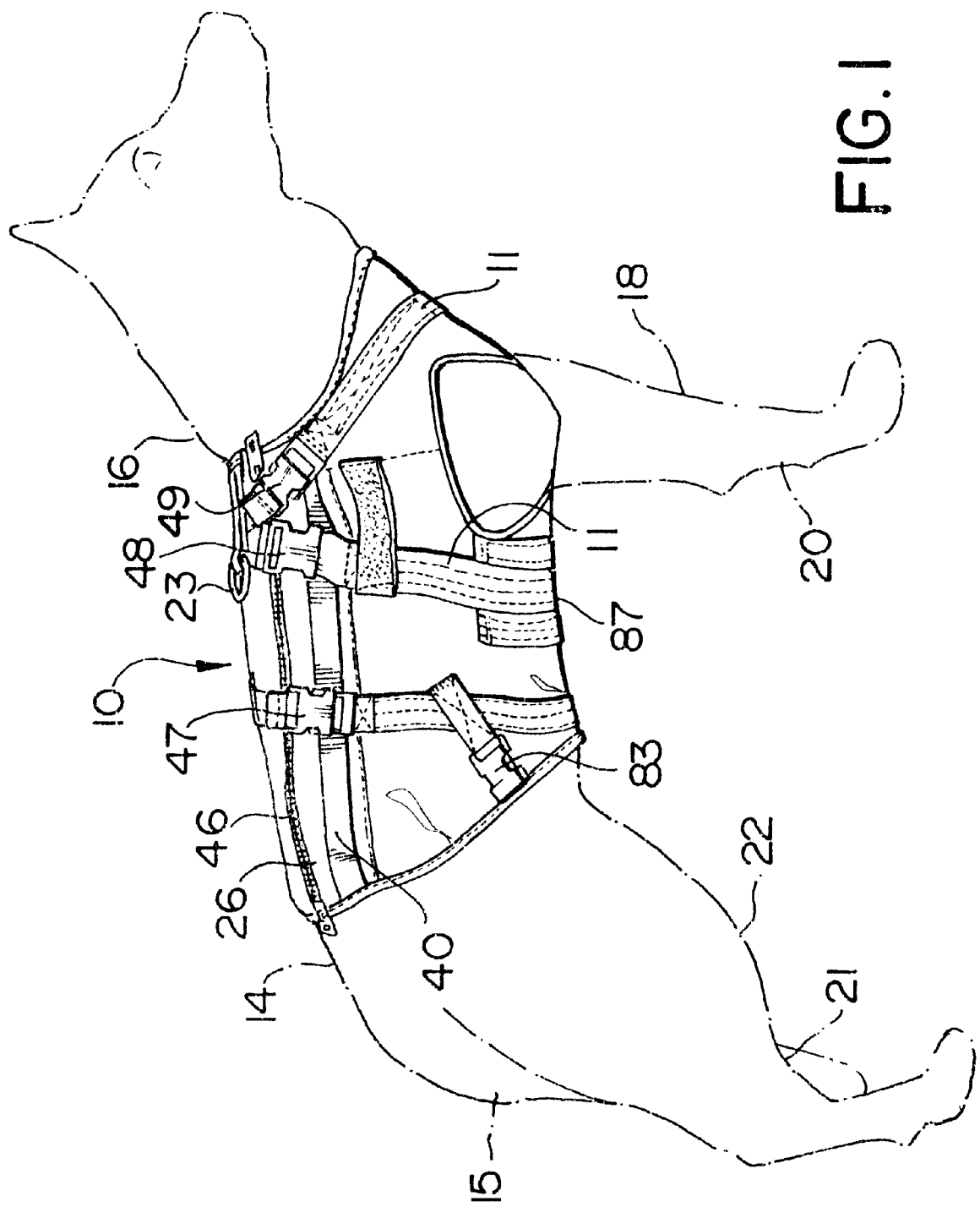
FIG. 1 shows a perspective view of the vest on a dog.
Figure 2:
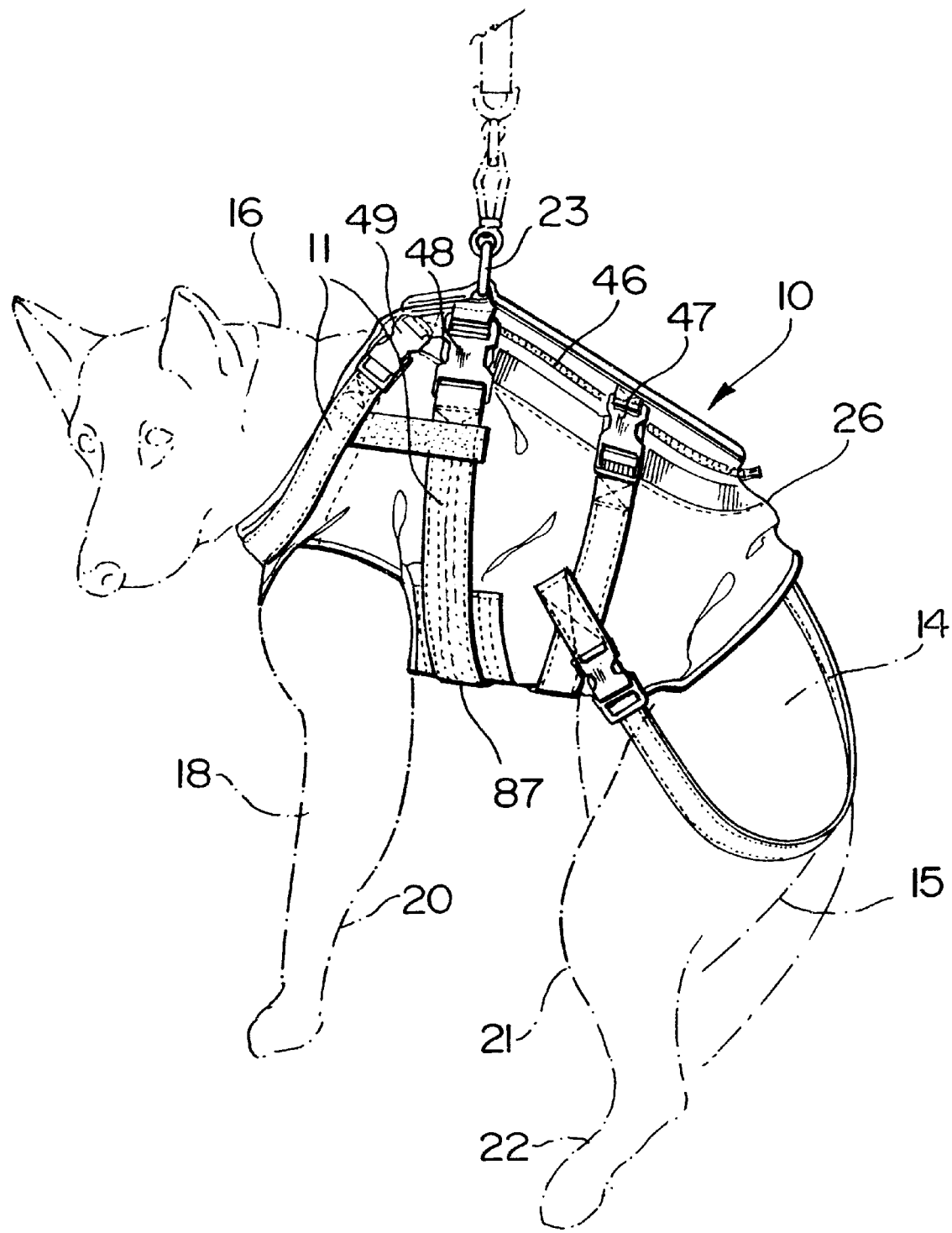
FIG. 2 is a (perspective) side view of the vest on a dog secured to a rope.
Figure 3:
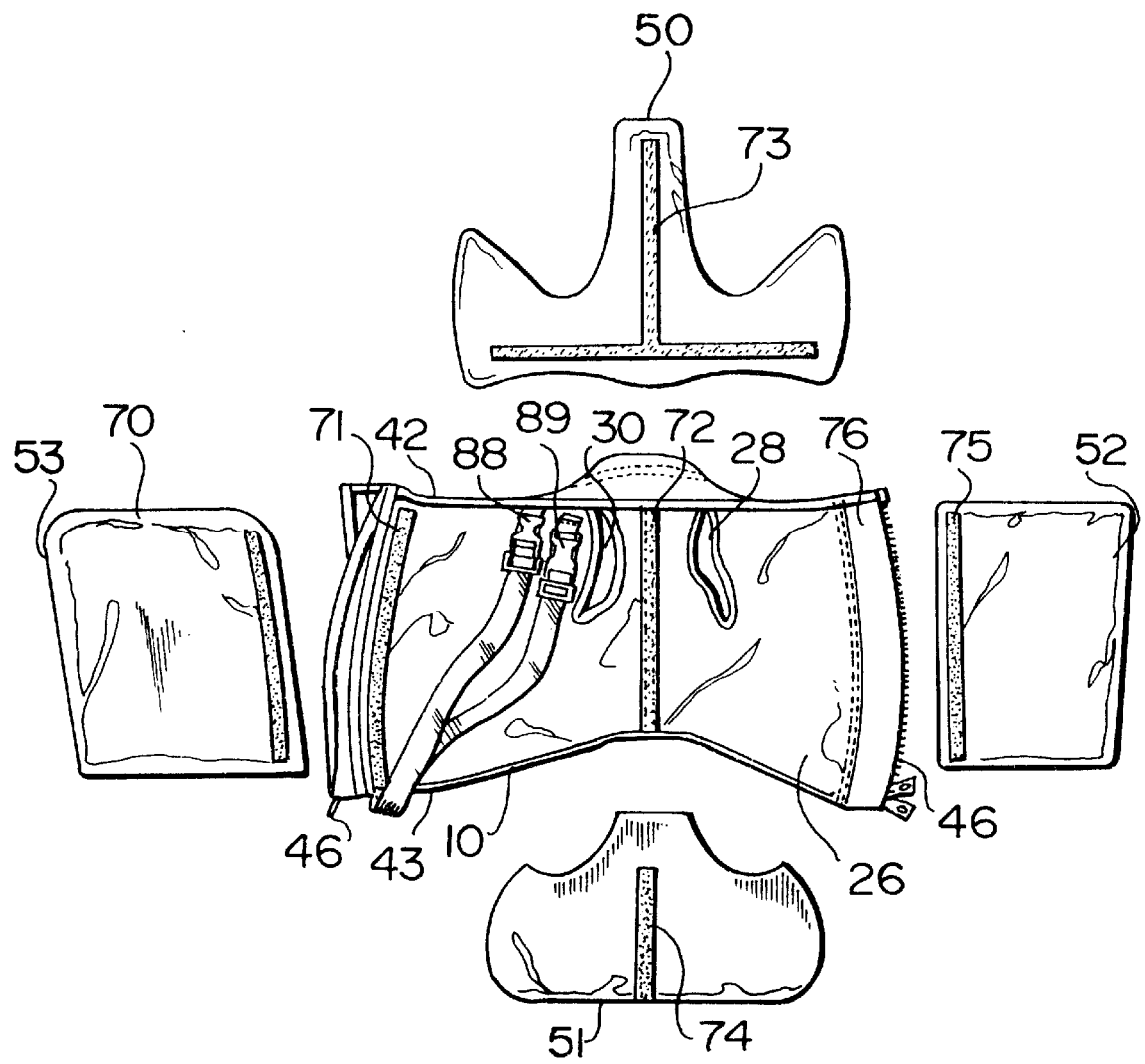
FIG. 3 is a plan view of components of the vest.
Figure 4:
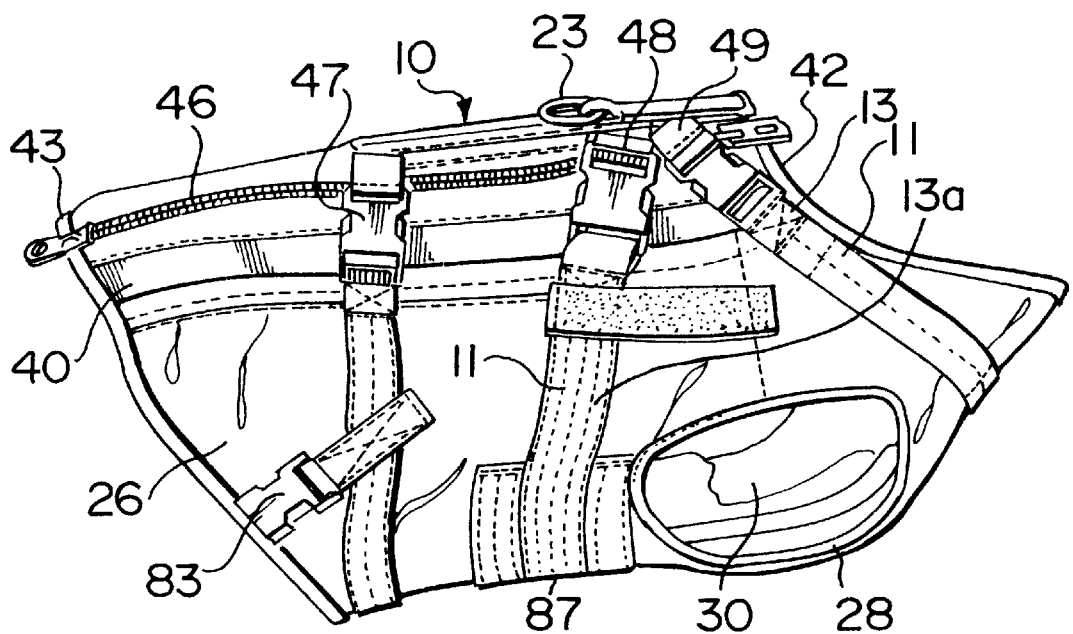
FIG. 4 is a side view of the assembled vest.
Figure 5:
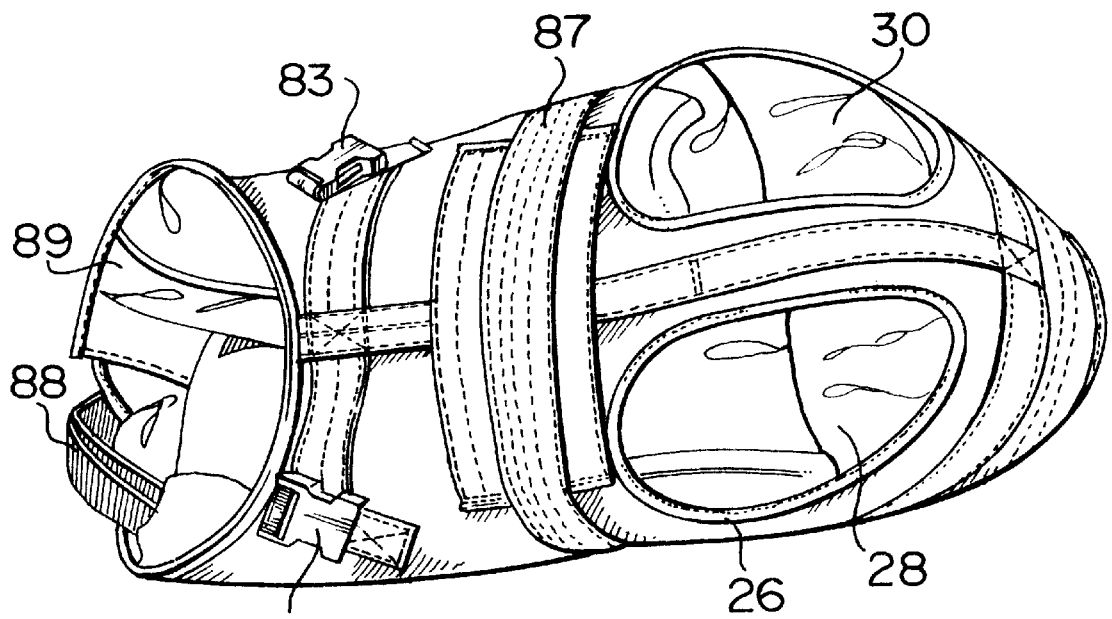
FIG. 5 is a bottom view of the assembled vest.

With reference to FIG. 1 the bullet-proof vest is designated by the numeral 10 and is displayed on a canine 14. The canine 14 has a neck 16; front legs 18, 20; hind legs 21, 22 and a tail 15. The vest 10 includes a carrier or body 26 made of Cordura, a synthetic fibre (trade name of Dupont; two apertures 28, 30 for the front legs 18, 20; an elastic panel 40, (FIG. 4) running from one edge 42, near the neck 16, to the opposite edge 43. The two-way sliding interlocking fastener 46, (FIGS. 1, 4) runs parallel to the elastic panel 40, on the top side from and to the said edges, 42, 43. The vest also has a tracking harness 11 (FIG. 4) composed of one strap 13 which runs along the neck 16, of the canine 14 and another 13(a) which is located vertically on the side of the carrier and both attach to co-operating buckles 48, 49 found near the edge 42 closest to the neck 16 of the canine 14, as shown in (FIG. 3) The vest 10 provides protection for the canine 14 by way of four fitted Kevlar (trade name of Dupont) (FIG. 3) panels 50, 51, 52, and 53. Panel 50, is shaped in the form of a T and fits over the chest, heart, upper shoulder and sternum (not shown) of the Canine 14. Panel 51, also in a T form is placed to overlap panel 50 in the chest, heart and sternum areas. Panel 51 further extends to shield the lower thoracic cage and abdomen (not shown). Panels 52, 53 are rectangular and shield the canine 14 on either side and along the vertebrae. The said panels 50, 51, 52, 53 are secured to the carrier 10, by way of self-adhesive strips, Velcro (trade name of Velcro Corp) 70, 71, 72, 73, 74, 75 and 76, found on panels 50, 51, 52, and 53 and the carrier 10. For purposes of rappelling the vest is equipped with a 'D' ring 23 (FIG. 2) located near the edge 42 of the carrier 10 and the rappelling harness 87 is reinforced underneath the carrier 26 FIG. 2. As well, in such situations two straps 88, 89, normally hidden in the carrier 26 are wrapped underneath the hind legs 12, 22 of the canine 14 and are secured to the two side opening buckles 83, 84 on the stern part of the vest 10, (FIGS. 3, 4).

In use on a canine, a handler takes the female part of buckle 49 in right hand and male part of buckle 49 in left hand, places vest 10 under the neck 16 of the canine 14 and fastens the buckle on the back of the neck 16 of the canine 14. The front legs are 18, 20 are guided through the apertures 28, 30. The handler stretches the vest 10 along the canine 14 until the two sides of the two-way interlocking fastener 46 are parallel and fastens the interlocking fastener 46 from either direction. The male and female parts of buckles 48 and 47 are then joined. In case the need for rappelling arises two straps 88, 89 run from the spine of the vest 10 into which they are sewn and underneath the hind legs 21, 22 and connect to the buckles 83, 84 on either side of the carrier 26. The 'D' ring 23 would also be used to secure the canine 14 to the rappelling rope. In tracking situation straps 88, 89 are secured in the carrier thus eliminating any loose parts which may inhibit the performance of the canine 14.

What is claimed is:

1. A canine ballistic vest and harness comprising:
   (a) a carrier of synthetic textile material adapted to cover the underside of a dog, fastening means on side edges of the carrier to fasten the carrier along the back portion of the dog;
   (b) a plurality of panels of ballistic material held in place by the carrier to protect at least a chest portion and vital portions of sides of the dog;
   (c) an elastic panel extending longitudinally along an entire side edge of the carrier spaced from the side edge; and
   (d) a rappelling harness comprising
      two straps sewn into a spine of the vest allowing the dog to sit on a rappel; and
      a welded ring allowing the attachment of the vest and hence the dog to a rope or descending equipment.

2. A canine ballistic vest and harness comprising:
   (a) a carrier of synthetic textile material adapted to cover the underside of a dog, fastening means on side edges of the carrier to fasten the carrier along the back portion of the dog;
   (b) a plurality of panels of ballistic material held in place by the carrier to protect at least a chest portion and vital portions of sides of the dog;
   (c) an elastic panel extending longitudinally along an entire side edge of the carrier spaced from the side edge; and
   (d) a rappelling harness comprising
      two straps sewn into a spine of the vest allowing the dog to sit on a rappel;
      a welded ring allowing the attachment of the vest and hence the dog to a rope or descending equipment; and
      the vest also including a tracking harness.

* * * * *